Figure 1:
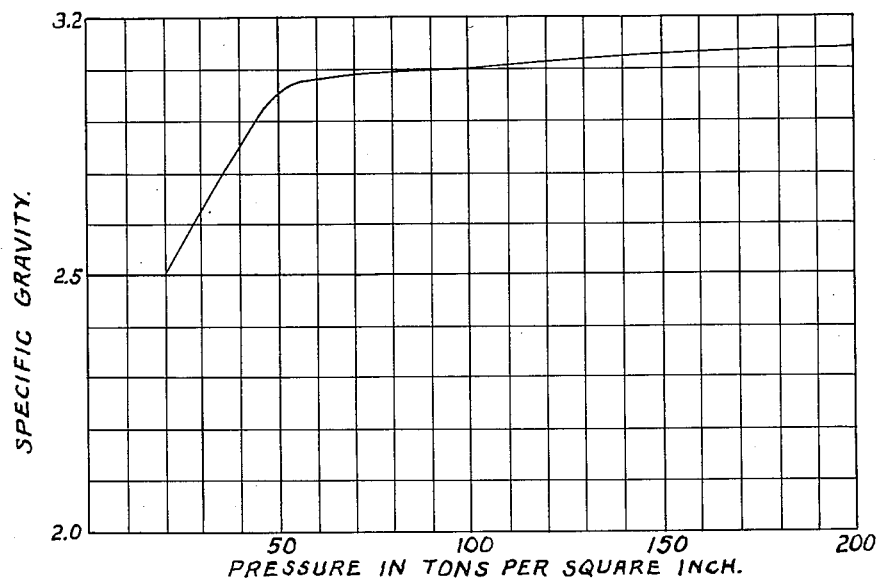

Feb. 19, 1963    A. L. DE LISLE    3,078,175
PRODUCTION OF IMPROVED SYNTHETIC STONE BODIES
WITH CONTROLLED PROPERTIES
Filed Jan. 16, 1959

INVENTOR.
AUGUSTE LOUIS de LISLE.
BY 3,078,175
PRODUCTION OF IMPROVED SYNTHETIC STONE BODIES WITH CONTROLLED PROPERTIES
Auguste Louis de Lisle, Phoenix, Ariz., assignor to Phoenix Gems, Inc., a corporation of Arizona
Filed Jan. 16, 1959, Ser. No. 787,152
10 Claims. (Cl. 106—97)

My invention relates to the production of synthetic, stone-like materials having new and improved properties not heretofore produced. It relates more in particular to a range of synthetic stone-like materials forming highly useful aggregates for the production of cast concrete and other monolithic structures together with such structures.

Inorganic stone or stone-like materials as building components go back to antiquity. In general the first stones used were selected because of availability, workability, durability, and appearance; and apparently, first attempts to use such stones were not accompanied by the use of any cementitious material. Later they were held together with cements of various types, frequently hydraulic cements such as the so-called Portland cement. The first hydraulic cements used were produced by calcining naturally-occurring stony outcroppings such as the material commonly referred to as cement rock and comprising a mixture of calcium oxide (CaO) and silicon dioxide ($SiO_2$) with other included substances which are either inert and do not participate in the cementing action or, as in the case of such substances as alkali metal aluminates, having the property of forming complex systems with the calcium oxide and silica present.

While the cement industry continues to be highly empirical, there has been a large amount of work in recent years to improve on naturally-occurring cementitious substances by the removal of undesired materials from naturally-occurring rock, by ore beneficiation methods including flotation, and the addition of naturally-occurring stony constituents having the property of enriching a selected raw material preparatory to calcining the same. While hydraulic cements approaching the properties of Portland cement have been found in relatively small and dispersed quantities, Portland cement as such—which is by far the principally used hydraulic cement product—was produced something over a hundred years ago by grinding together calcareous and argillaceous materials, calcining the same, and then grinding the resulting clinker to produce the final commercial cement product. Since this original development of a true Portland cement, there has been an extensive and continuous but, for the most part, empirical development in the production of cements and in the use of such cements to produce concrete.

Concomitantly with the development of improved hydraulic cements, attempts have been made to produce improved stone for building and descorative purposes. The patent and technical literature is replete with descriptions for the production of artificial stone, imitation marble and other products simulating or intended to improve upon naturally-occurring stone materials; but none of such products has come into appreciable commercial use. The only definite progress in the direction of producing substitutes or replacements for naturally-occurring stone building materials is in the development of modern concrete. This development of modern concrete has resulted in the production of so-called monolithic structures without which modern technology would either have been impossible or rendered markedly more difficult. This development of concrete as a major building material has been due substantially entirely to three factors, and in later years to a fourth factor.

The major advance probably is in the production of improved hydraulic cements such as the five usual types of Portland cement. The second development has been entirely empirical and comprises improved aggregate modulating, mixing, casting and the like procedures. Reinforcement of concrete structures by steel rods and other strengthening materials has also been a very important advance. While in recent years the preparation of so-called "stressed" concrete (either pre- or post-stressed) has offered promise of still further improvement.

Notwithstanding all these changes, however, there has been practically no improvement in the main body of the concrete, namely, in the aggregates used in the mix, except insofar as special selection and grading of naturally-occurring materials have been made possible for special installations; and even here the results are definitely inconclusive. As an example in many types of concrete structures a factor of safety of 3 would be more than adequate; but to assure a factor of safety of 3 engineering must be approached on the assumption that a factor of safety of 7 to 10 is necessary.

Limitations in the production of concrete and the like structures have been imposed because of several conditions, all having their genesis in limitations of the aggregates themselves. Even though the stone, gravel and sand comprising the aggregate for a structure are modulated to minimum voids, the compressive strength is determined very greatly by the limitations in the cement matrix which holds the aggregate together. The expression "modulated to minimum voids" as employed in the previous sentence, has its usual meaning in the art, and signifies that the aggregate particles are so selected as to size and proportion of each size that the resulting product has substantially the minimum amount of void space obtainable. There is normally no direct chemical bond between the aggregates and the cement matrix, so that as soon as pressure is applied to a concrete structure there tends to be a cleavage between the matrix and aggregate caused by the shear action which occurs. A test cylinder of hydrated neat cement, Portland type 1, shows a compressive strength of approximately 4,000 lbs./sq. in., depending on various factors, but in no case in excess of about 7,000 lbs./sq. in. While the modulated aggregate will increase this compressive strength to sometimes as much as 12,000 p.s.i. under the most advantageous test conditions, particularly if the test cylinder is firmly supported on its entire base and pressure applied to the entire top surface of the test cylinder, there are definite limitations in compressive strength, especially when pressure is applied in such way as to permit some shearing action.

In this connection it is found that almost invariably when a concrete body is stressed to breaking, either with a test sample or in an actual case of failure—and even when cracks appear as in a concrete floor—separation occurs between the cement matrix and the aggregates. This manifestation is well known in the industry and is commonly referred to as "pull out."

While the compressive strength of concrete may be increased by careful attention to modulation—even though aggregate pull-out places very definite limitations on the effects of modulation—tensile strength for all practical purposes is a factor of the matrix itself. It is not improved by modulating to minimum voids but, on the contrary, may be decreased. In fact, the tensile strength of concrete itself is so marginal that engineered structures place very little reliance on this factor.

In addition to the limitations in concrete structures because of the failure to form a bond between the aggregate and the cement matrix, there are other well-known problems. One of these is definitely concerned with nonuniformity. Each type of stone-like aggregate material has its own failure pattern. Some agregates split in cleavage planes, some crumble, some have amorphous areas, and almost all have inclusions to a greater or less extent of other types of naturally-occurring calcareous, argillaceous and the like substances. It is therefore extremely difficult to select aggregate material to provide special desired properties. There have been many attempts to produce or select special aggregates and special treatments for the aggregates or the concrete using them. Colors, for example, have been completely unsatisfactory; and even many naturally-occurring colored products either fade or show a spectrum shift on exposure to sunlight, wear, etc. In the case of colored aggregates for terrazzo and the like, for example, there is only one known naturally-occurring blue which will not fade on exposure to sunlight, and that is the relatively expensive lapis lazuli.

Attempts have been made to utilize synthetically-produced vitreous and ceramic aggregates in special concrete-like structures, particularly where decoration is a factor; but failure in the long run has accompanied all such attempts. In addition to frangibility of this type of material there are also the problems of fading, spectrum shift, uneven wear, non-uniform resistance to acid and other constituents in the air, water and the like coming in contact with them; moreover, they have been decidedly uneconomical considering the advantages gained.

The principal object of my invention is the provision of an improved synthetic stone material particularly adapted for use in concrete, terrazzo, and the like structures.

Another object is the provision of a synthetic stone material capable of a high degree of modulation to produce special advantages and special purpose structures.

Another object is the provision of an improved synthetic stone material having such effectiveness for the purpose intended that the relatively higher cost of producing the same, as contrasted with the cost of naturally-occurring aggregate materials, will not inhibit its commercial use.

A still further object of my invention is the provision of a truly monolithic concrete structure in which crystal growth occurs between the aggregate and matrix portions.

Yet another object of my invention is the provision of an improved high-strength concrete and high-strength aggregate therefor of such uniform and predictable properties that the usual factor of safety provided in concrete practice may be markedly reduced without in fact showing any loss in the actual predictable safety factor.

An additional object is to produce an improved, colored concrete and a uniform, hard, synthetic aggregate therefor—both the concrete and the aggregate having the properties of high strength, resistance to abrasion, and color fastness.

Still another object is the provision of a light weight, high-strength aggregate and concrete structure.

A further object is to produce improved special aggregates and concrete structures therefrom for specific selected purposes including such functions as resistance to spalling, controlled conductivity, and resistance to penetration by harmful radiation without appreciable loss of strength and other desired concrete characteristics.

A final object of my invention is the provision of improved methods for producing uniformly aggregates and structures of concrete and the like having the above noted characteristics in controlled amount within commercially usable limits, and in which various special properties may be combined, both in the aggregates and the concrete structures produced therefrom.

While my invention is not normally susceptible of illustration by drawings, I have appended hereto a drawing comprising two charts showing typical characteristics of one form of aggregate produced in accordance with my invention.

Figure 2:
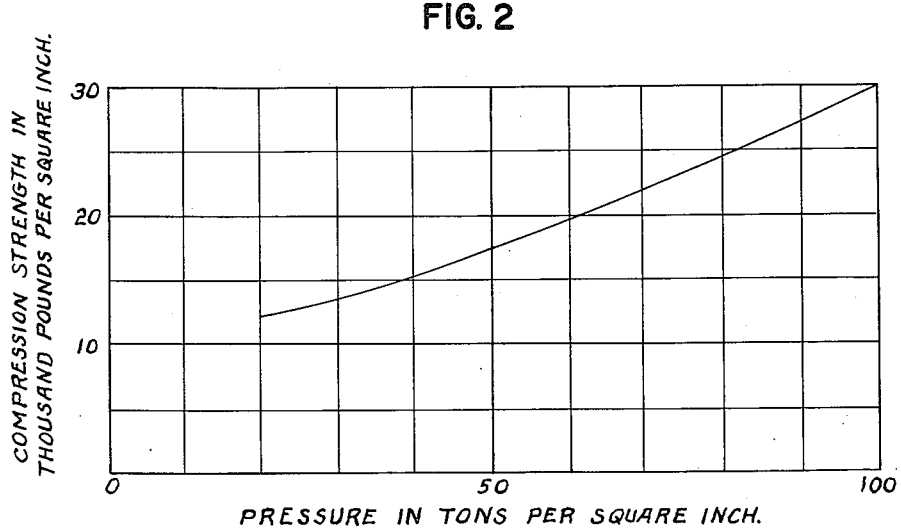

In the drawings:

FIG. 1 is a graph plotting the specific gravity of certain products of the present invention against the pressure applied to them in tons per square inch, and FIG. 2 is a graph showing the compressive strength of certain products of the present invention resulting from a pressure employed in their production expressed in tons per square inch.

Briefly, in carrying out my invention—and this statement is made without regard to specificity of various modifying features and details—I employ as a starting material a hydraulic cement, preferably but not limited to a cement of the Portland type, which, with or without an admixture of a compatible modifying substance, is compressed to produce a form-retaining slug, the slug crushed to produce fragments of random size and shape, the fragments classified and modulated in accordance with concrete, terrazzo and the like practice, and the modulated fragments crystallized preferably in an excess of water to promote cooling. When the aggregates have cooled, the excess water is removed and they are employed as the aggregate with a hydraulic cement, preferably of the same type as that from which the aggregates were produced, and enough water to produce a castable mixture.

In order that those skilled in the art may understand the details of my invention and the manner of practicing the same, I shall first amplify the steps of the method and variations of each step, provide specific empirical test data including the significant properties of the aggregates and structures cast therewith, and conclude with a number of specific examples showing the practice of the invention from the selection of materials to their incorporation in a concrete or the like structure.

Since my invention is concerned generally with natural stone substitutes such as represented by the concrete and terrazzo industries, and notwithstanding the fact that I have departed markedly from the common practices in such industries, the invention will necessarily be explained in part at least by reference to terms and practices used in such industries. Those skilled in the art are referred to the following publications for further elaboration of some of the following explanation: Chemical Process Industries, by Shreve, 2nd edition, McGraw-Hill; A.S.T.M. specifications, C-150-49; Concrete Engineers Handbook, McGraw-Hill; Chemistry of Portland Cement, by R. H. Bogue, Reinhold Publishing Co.; Chemistry of Coordinate Bonding, by John Jailor; American Chemical Society Monograph Series No. 131.

The starting material used is a hydraulic cement as such or a substance or mixture of substances which, because of their chemical composition, will produce the types of solid state chemical reactions generally characteristic of the hydraulic cements. Unless there is some specific reason to the contrary, as where special characteristics are required, I prefer to use a regular type 1 commercial Portland cement because of its availability, cheapness, and other established commercial characteristics. It is very suitable in my invention for the production of extremely high strength aggregates at less cost usually than most available special products. A Portland cement can be thought of as comprising principally the system $CaO-SiO_2$; but since it contains varying proportions of $Al_2O_3$ and $Fe_2O_3$ (with at times other admixtures such as MgO, BaO, etc.) depending upon the source of the raw materials and the characteristics desired in the final product, Portland cement can also be considered as involving a mixture of various two-, three-, four-, five- and other multiple-component systems. Actually, ten two-component systems have been identified; ten three- and only a portion of the four-component systems, e.g., the $CaO-SiO_2-Al_2O_3$ and $CaO-SiO_2-Al_2O_3-MgO$ systems. The various constituents present interact and produce crystals involving at least thirty possible component systems. The most important compounds from the standpoint of cementing action of the complex system are dicalcium silicate (usually abbreviated $C_2S$), tricalcium silicate (usually abbreviated $C_3S$), tricalcium aluminate ($C_3A$), and tetracalcium aluminalferrite ($C_4Al$).

In addition to type 1 Portland cement I have also used successfully as starting material the type 2 Portland cement which has a somewhat decreased heat of hardening and is characterized by excess $SiO_2$. The type 3 Portland cement containing an increased proportion of $C_3A$ and hence having the property of higher early strength, hydrated type 4 with its low heat, and the high sulfate-resistant type 5 have also been used. But in general, except in unusual instances, they offer no advantage over the more common and less expensive type 1. One of the Portland type cements which I have used extensively in experimental work is the so-called white Portland cement which generally resembles the type 1 but has much less ferric oxide content. As a matter of fact, for color work I prefer to employ a white Portland cement containing substantially no ferric oxide.

Other usable starting raw materials are pozzuolana cements and calcium aluminate cements. In general I have not found any advantage in using any of the relatively new corrosion-resisting cements commonly employed for corrosion-proof linings and chemical equipment, but there is no objection to their use.

There are several types of waste materials having the properties of hydraulic cement which I have used quite successfully in experimental work. One is the ash from the burning of Dubbs process petroleum residues, and the other is the Cottrell precipitate from the stacks of cement plants—the latter a material which frequently is accumulated in such quantities as to make disposal a problem. When through preliminary beneficiation means or because of natural selection the Cottrell precipitate is extremely low in free alkalies calculated as NaOH, all such precipitate can be mixed with the regular ground clinker and bagged as cement. Because of its fine state of subdivision it is, in general, a desirable addition product. Since the specification for Portland cement places a mandatory upper limit on the percentage of free alkali present, however, much of this raw material cannot be used and it becomes a very inexpensive and very valuable starting raw material for many aggregates because in the treatment in accordance with my invention the excess alkali is readily leached out.

The finely divided hydraulic cement, or an intimate mixture of a hydraulic cement and a compatible modifying material, is subjected in the dry state to a hydraulic pressure at least sufficient to produce a form-retaining slug which will not disintegrate on handling or when subjected to further steps in the process. In general a pressure of 20 tons/sq. in. is adequate for compaction, but the pressure may be as great as 200 tons/sq. in. or greater if desired. For most purposes a pressure of 40 tons/sq. in. is suitable, and in general I have not found it necessary to exceed approximately 100 tons to produce aggregates of suitable density. A two-stage compaction step may be employed if desired, and this practice in general produces higher densities and greater hardness. The significance of pressure as it relates to density, hardness and strength will be explained in greater detail hereinbelow by reference to the drawngs. When an extremely high density is desired I have found it advisable to preliminarily press a slug at 40 tons/sq. in., crush the resulting slug, modulate it, and re-press to a higher pressure such as 100 tons/sq. in. This is particularly desirable if high surface polish should be required, or if extremely low water absorption is sought. I have also found that the two-step compression method tends to inhibit separation and flaking, which sometimes occur particularly if the equipment used or its operation is such that constant uniform pressure is impossible. For this reason the best results are obtained with a high capacity hydraulic press in which the slug is not greater in length than the diameter of the ram or rod with which the pressure is applied.

I have previously referred to the use of a mixture of cement and a modifying material. It is to be understood that the dry pulverulent hydraulic cement and the modifying material in dry condition are thoroughly mixed as by ball milling, and thereafter subjected dry to the necessary compacting pressure. In some instances the modifying material and/or the intended use of the aggregate will indicate use of pressure lower than the maximum. As an example, I have found that with most colors there is no practical limitation in the use of extremely high pressures; but since colored aggregates are almost always produced for decorative purposes, it is not advisable to achieve such density and/or hardness that their resistance to abrasion and other properties will markedly differ from the matrix surrounding them. Too great a difference in the wear properties of an aggregate and matrix can produce an irregular floor, for example. On the other hand, diatomaceous earth is a light weight material in which each particle provides a void; but in general I have found it impossible to so compress a dry mixture of hydraulic cement and diatomaceous earth that the desirable properties of the diatomaceous earth are lost. Vesiculated perlite, however, which may be preferred with dry cement to produce a very light weight but strong aggregate, is crushed by the application of too much pressure so that its desirable properties can be lost.

The initial proportions of a hydraulic cement and a compatible material will, of course, vary with the admixed material used and the final properties desired. There should, in general, always be sufficient setting material to form a firm matrix comprising at least 50% of the total by volume. If the material added to the cement, which may be termed the addition material, will form a system with any of the cement fractions so as in effect to become a part of the crystallized matrix, then the proportion of addition material may be somewhat greater than if it is a completely inert material. Normally, proportions are established by weight, but the volume aspect must be kept in mind. As an example, when diatomaceous earth is used with cement to produce an aggregate, 10 to 20% by weight and up to 30% by weight of diatomite produces good results; but up to 40% or more can be used—more than 50% by volume—with some loss of strength notwithstanding the fact that diatomite appears to combine chemically with hydraulic cement when used in accordance with my invention. In such instances, strength may be decreased but other desirable properties, particularly lightness and thermal resistance, are greatly enhanced. For all practical purposes, if the added material is compatible with the cement, it may at times comprise up to 75% by volume, with some loss of strength because only 25% of cement matrix is present by volume. In the case of such addition materials as metal fragments, for example, particularly when there is no actual bonding to the addition material, the proportion of additive should in general not be greater than 50% by weight, notwithstanding that this may comprise only about 30% by volume.

Because of the relatively high initial pressures involved, the form-retaining slugs produced by the first compression step of the process will, in general, be somewhat limited in cross section and overall size. I have successfully produced slugs 1¾" in diameter and approximately 1¾" long at relatively high capacity suitable for commercial practice by special automatic feeds to specially designed equipment and corresponding fast actuation of the hydraulic ram. Too great a length of slug cannot be produced because of limitations in die structure and because of the fact that there is less "drag" with much better and more uniform compaction if the thickness of the cake produced approximately equals its diameter. The slug therefore is preferably cylindrical, with the thickness approximately the same or even less than the diameter. Theoretically, somewhat improved results would be obtainable by the production of a spherical slug, but production and maintenance of equipment are limiting factors so that for practical results in most instances a cylindrical slug is good enough.

The compacted slugs are crushed on rolls in such a way as to produce a minimum of fines, using available equipment. The crushing produces irregular, random shapes and sizes of fragments. The fragments are graded and classified in accordance with their intended use, the fines being returned for further compression and the oversize portions returned for further crushing. When forming colored aggregates the oversize fragments, if desired, particularly those with flat surfaces, may be treated by further steps of the process to produce a hard, crystallized aggregate material usable by craftsmen for the production of special panels such as those of so-called Venetian terrazzo. The practice in this art is sometimes to set in large aggregates by hand, and the larger fractions from the initial crushing of the slugs are very desirable for this purpose. The tonnage of this type of product would of course always be on the very low side.

To produce an aggregate for concrete work, I employ a series of vibrating screens graduating from largest to smallest mesh and preferably mounted with the size of the mesh graduating downwardly. The oversize fragments are trapped on the first screen, and five graduated sizes are produced by passage through the successive screens. The smallest screen is suitably 80 mesh so that it will retain on its surface relatively finely-divided fragments approximately equal to the size of river sand, the unusable fines passing through the screen for return to the first step of the process.

In terrazzo practice there frequently is no aggregate equivalent to sand in concrete practice, the fractions being graded typically into sizes 0, 1 and 2. Size 0 includes pieces between ⅛ and 3/16" in diameter; size 1 pieces, between 3/16 and ¼"; and size 2 pieces, between ¼ and ½". One common formulation in the terrazzo industry is to use four parts of size 0, two parts of size 1, and one part of size 2 aggregates. This modulation is illustrative, but any desired modulation common to this particular art may be employed. For concrete use, whether the aggregates are colored or for other properties, modulation to the percentage of voids desired can be determined by referring to any concrete engineers' handbook. Where maximum strength is required, for example, modulation should be to minimum voids. The mechanism for producing any particular type of aggregate modulation and the types of structures using the same may be determined by consulting any standard concrete engineers' handbook. Modulation using my invention, however, is markedly simplified as contrasted with the prior art practices. As all standard civil engineers' and the like handbooks show, modulation of an aggregate is the selection of various sizes of aggregates, sometimes down to and including sand, and various proportions of each size aggregate, to obtain a pre-determined percentage of void space, and the modulation selected and character of aggregate used together determine the compressive strength of a concrete. In terrazzo, as inducted hereinabove, aggregate modulation is based on the same factors, except that normally no sand is employed in terrazzo. The term "modulation" as used herein is used in the usual sense to mean selection of (1) how many sizes of aggregate are used, (2) what range of sizes are used, and (3) what percentage of each size aggregate is used in the final "modulated" product. It should be noted, also, that the aggregates may be modulated, or graded as to the number of sizes, range of sizes and proportion of each, either before or after the final step of their production.

The aggregates are crystallized preferably in water, sufficient water volume being used to prevent such overheating as would cause cracking of the pressed fragments. In general, one volume of aggregates and three volumes of water by weight are satisfactory; or, where the resulting exothermic action is particularly rapid, as when the initial dry mix has been very finely ground or extremely high pressures have been used, crystallizing water may be caused to flow continuously past them. During crystallizing the fragments are also preferably rolled, tumbled or otherwise agitated to prevent agglomeration. A suitable treatment is to charge the fragments onto a cylindrical rotating screen, the lower portion of which projects into a tank containing a relatively large volume of water, or a tank in which cooling water is continually supplied and waste water is delivered through an overflow.

With a suitable volume of water, the development of the highest temperature occurs in from approximately four to eight hours. The action is sufficiently completed normally in twenty-four to forty-eight hours that the crystallized aggregates can be removed, the excess water drained from them, and then immediately used directly in the preparation of a concrete product, as will be explained. There is some slight improvement in the product after its initial period of water crystallization, but the improvement is slight and for all practical purposes usually can be disregarded in aggregate preparation. It appears probable, however, that the aggregates continue to crystallize for quite a long time, both within themselves and with the cement matrix after they are combined with cement to form a concrete body. In other words, after twenty-four hours they are usually usable as aggregates, and any changes which occur after their use will be such as to improve the concrete, not to affect it adversely as some aggregates have been known to do.

As a rule, when the dry initially-compacted material is more finely divided, the crystallized aggregate will continue to develop heat for a longer period of time, as does also the aggregate pressed initially at relatively very high pressures. This is contrary to what would be assumed, as it would normally be thought that the more intimate the association of particles, the faster would be the solid state reactions which occur between them. I have observed, however, that the total heat evolved appears to increase as pressure is increased or average particle size is reduced.

The unusual properties of the aggregates will be pointed out more in particular in consideration of the physico-chemical mechanism thought to be involved, and specific examples of uses thereof. I wish to point out at this time, however, that in addition to being used to produce unusual cast structures, the colored aggregates may be ground to pigment fineness to produce a light-fast cement, mortar or plaster color fully controllable to match any desired shade in color and intensity.

To product a novel, truly monolithic concrete, terrazzo or the like structure in which there is no pull-out of aggregate from the matrix, the modulated aggregates are mixed with cement, preferably substantially of the type used in their production, and enough water is added to produce a wet castable mixture generally in accordance with standard practices employing standard equipment and techniques. When a concrete structure is being produced, the proportions are suitably from 10–20% by weight of dry cement to 80–90% of substantially dry aggregate. Terrazzos use a greater proportion of cement, commonly white Portland, running up to 40% by weight or sometimes even somewhat higher. Usual casting techniques, including the use of centrifugal casting equipment, vibration, vacuum mates and the like, may also be used, frequently with greater advantage than when conventional concrete is produced.

The novel and highly beneficial property noted in my invention, and which is common to all phases of its practice, is the definitely recognizable crystal intergrowth which occurs between the aggregates and the cement matrix. In terrazzo work, this property is advantageous in that there is very little pull-out during surface grinding, and retreatment with a cement slip or grout after surface grinding is frequently entirely unnecessary.

For the purpose of considering more in detail the physical properties of the aggregates of my invention, I have shown in the drawings data for density (using a single slug compacting pressure step) and the resulting strength based on the use of a type 1 Portland cement ball milled to a fineness of at least 50 microns, and in which at least 90% of the cement particles are —10 microns. In all instances the slugs were produced in the form of 1¾" diameter, 1¾" thick cakes using only a single-step pressure compacting step. Looking at FIGS. 1 and 2 it will be seen that the following relations of pressure to density, expressed as specific gravity and compressive strength, have been established:

| Per sq. in. | Density as S.G. | Compressing, p.s.i. |
|---|---|---|
| 20 tons | 2.5 | [1] 12,000 |
| 40 tons | 2.75 | 15,000 |
| 50 tons | 2.85 | 18,000 |
| 100 tons | 2.9 | 30,000 |
| 200 tons | 2.95 | |

[1] Increases to 14,000 when crystallized in zinc magnesium fluosilicate.

In all instances tabulated above, the test aggregates were crystallized in three parts of water to one part by weight of the aggregates. Tests have shown that this particular type 1, ball milled and compressed aggregate absorbs only 4–5% its weight of water, depending on the pressure applied in producing the slug. This water is substantially completely lost with time. Allowance was made for this water in determining the specific gravity. For comparison, the same type 1 Portland cement used in the production of test aggregates was found to have a specific gravity of 1.4 dry and 2.4 when hydrated to form a test sample in accordance with best established handbook practice. Since this sample definitely has an increased water absorption by at least three mechanisms, viz., hydration, adsorption and interstitial entrapment, the actual specific gravity of the test neat cement sample undoubtedly is less than 2.4. Taking the established figures, however, there is an increase in density of the aggregate as contrasted with neat cement of at least 5%.

Since established cement and concrete practice requires the use of a 6" diameter, 12" long test cylinder, the figures for strength under compression were obtained by modulating the test aggregates to minimum voids and mixing four parts by weight with one part by weight of dry cement, water q.s., and casting a test cylinder. Compressive strengths of 12,000–30,000 p.s.i., as given above, were determined by utilizing such cast test cylinder. For comparison, the same type 1 Portland cement from which such test cylinders was made was ball milled to different degrees of fineness and hydrated in accordance with established test practices in the industry, and such cylinders showed strength under compression of between 4,000 and 7,000 p.s.i. Chemically, in other words, the two sets of test products were identical except insofar as the treatment of the present invention affects the physico-chemical structure among the constituents of the mix resulting from solid state reactions caused by the practice of my invention.

A further series of tests was conducted to determine the physical properties of the aggregates themselves, using as near standard procedures as possible. Since it was impossible with available equipment and knowledge to produce a solid aggregate having the shape and size of the standard crushing strength test cylinder—viz., 6" diameter, 12" long—I produced a series of smaller cylinders of graduated size in which the length was twice the diameter. These smaller test cylinders of graduated size, the largest being 1¾" in diameter, were crystallized in an excess of water to limit the resulting temperature rise. By subjecting such test cylinders to crushing tests and extrapolating the results, it was determined that a solid aggregate 6" in diameter and 12" long compressed at 40 tons/sq. in. and then crystallized in water would have a crushing strength of about 30,000 p.s.i. By similar extrapolation, an aggregate produced by the use of 100 tons/sq. in. compression should have a crushing strength of up to 50,000 to 60,000 p.s.i. following standard test procedures.

I also conducted a series of tests to determine the results of performing a plurality of pressure compacting steps on the initial dry hydraulic cement material. Following are the results of the two- as contrasted with the one-pressure step, using in all instances the same type 1 Portland cement:

| per sq. in. | Density as S.G. 1 pressing | Per sq. in. | Density as S.G. 2 pressings |
|---|---|---|---|
| 40 tons | 2.75 | 50 tons | 3.00 |
| 50 tons | 2.85 | 100 tons | 3.40 |
| 100 tons | 2.90 | 200 tons | 3.90 |

When subjecting the dry material to a double compacting step, it is usually better to first compact at a lower pressure and then at the higher pressure, but this procedure is not always necessary.

I have not been able to complete preparation of test samples using all of the double pressed aggregates, but based on increase in strength with specific gravity produced by increased pressure as shown in the drawings, it appears obvious that marked increase in concrete properties is obtainable. The practice of my invention—in which pressure is used on the dry product comprising a hydraulic cement before its crystallization to alter the dry weight specific gravity and directly affect the solid state chemical reactions on hydration qualitatively, or so extensively quantitatively as to comprise a qualitative difference—is not to be confused with prior art practices in which cement and/or concrete is subjected to pressures during hydration. Figures tell the story. The resulting known products are very lacking in tensile strength and develop a maximum crushing strength of the order of 12,000 p.s.i. while the tensile strength of my products is increased at least by a factor of 10 and the crushing strength ranges from about 12,000 p.s.i. upwardly to as much as 60,000 or possibly even more under the most favorable conditions.

Looking further at the curves comprising FIGS. 1 and 2, it will be noted that the density of the product is substantially a straight line function of pressure up to about 50 tons/sq. in., and thereafter the curve flattens out. Crushing strength based on density factors, on the other hand, develops more gradually, with the maximum rate of crushing strength increase falling between specific gravities of 2.85 and 2.9, with no definite flattening out as in the hardness curve. Results of test experiments for crushing strength when compression has occurred above 100 tons/sq. in. have not been given because of the relatively small number of tests heretofore carried out. It has been confirmed that strength continues to increase gradually, but such further hardness usually results in increased brittleness.

Keeping in mind that there are several contributing factors—principally the starting materials, the degree of fineness to which they are ground, the pressure and manner of compaction, and the method of crystallizing—which affect the final properties, I wish again to emphasize that the specific gravity and crushing strength figures given are based on the use of uncontaminated type 1 Portland cement, a single pressure slug-compacting step, and use of a standard test cylinder in which the aggregates are embedded in a cement matrix. Crushing strength of the aggregates themselves, if taken as a solid test cylinder, is normally found to be roughly double the figures charted based on scratch tests and the like.

The setting or hardening of cement when wetted by water has not been fully established because of the complexity of the system. Even the phase equilibrium of the various two-, three- and four-component systems is still unknown, although the CaO—SiO$_2$ and CaO—SiO$_2$—Al$_2$O$_3$ systems seem to have been fairly well established. It is generally agreed, moreover, that hardening or setting of cement takes place by hydration and hydrolysis. The exact mechanism remains unknown, but theoretical considerations explaining established facts indicate the presence of a very substantial proportion of combined water. This combined water would account for the marked increase in density of neat cement on hydration as contrasted with the compressed aggregates of my invention in which the specific gravity is increased only slightly on crystallization in water. The effect of water in the present invention appears to be more catalytic than in the case of neat cement, where it appears to have a stoichiometric relationship to the major constituents.

Instead of crystallizing the crushed and compressed slug fragments in water, other media may be used. A highly satisfactory medium is a "mag" solution, suitably about 3% of a water soluble alkali earth or alkali metal fluosilicate such as zinc, magnesium, sodium, potassium and the like, or a mixture thereof. Fluosilicates have been used as a wash after cement has set to prevent dusting, but they have not been successfully introduced into the body of the concrete because they cause the cement to set too rapidly. Using a solution for crystallizing the aggregates of my invention, the same practice is used as when crystallizing in water. The aggregates crystallized with a fluosilicate solution are hardened but made somewhat more brittle. The various fluosilicates appear to have about the same effect in increasing the crushing strength of the aggregates; but various fluosilicates appear to have a different effect on the tensile strength. Regardless of the fact that other aqueous media and equivalent liquids have an effect in crystallizing the aggregates, I have heretofore confined development work substantially entirely to the use of water with or without fluosilicate additions thereto, principally because of the firm stand in the cement industry, empirically reached, that no liquid medium except water can be used successfully in the hydration of hydraulic cement. In cement practice this position is undoubtedly sound, but further experimental work in the crystallization of the aggregates of my invention may yield interesting and improved results.

Examination of the completed synthetic aggregates of my invention, even under a relatively low power glass, shows surface maculae, particularly along broken surfaces as contrasted with surfaces in contact with the compressing dye during compression of the form-retaining slug. These maculae appear to be projecting portions of crystals, presumably C$_3$A, C$_3$S or C$_2$S, but also, possibly, any of the other relatively large number of crystals capable of being formed. There is a possibility, too, as will appear from further discussion, that these observed maculae represent crystallized bodies peculiar to a system resulting from the combination of steps employed in my invention. In any case, these maculae definitely form crystal nuclei for maculation and bonding between the aggregates themselves and between the aggregates and cement matrix to form a definite monolithic structure where pull-out of aggregates can't take place.

That there is a definite change in the physico-chemical structure of the aggregates, as contrasted with comparable hydrated neat cement, may be shown by several considerations. When a compressed but uncrystallized aggregate is broken, the fractured surface has an appearance characteristic of amorphous materials. The fractured surface of the completed aggregate, however, is flint-like, showing the appearance of a relatively large number of interlocking crystals. To compare crystalline structure, neat cement was caked at low pressure (100–500 lbs./sq. in.) and hydrated with water. After setting, samples were examined under a microscope. The crystals were predominantly triclinic and orthoclinic, and had an opaque appearance. The same type neat cement compressed at pressures above 20 tons/sq. in. and crystallized in water according to my process showed a dominance of ortorhombic crystals under the microscope. The crystals of the latter test samples, moreover, were transparent to translucent. The indicated differences become more pronounced and recognizable as the compacting pressure is increased.

The synthetic aggregates of my invention show a decided resistance to attack by alkali and acid media as contrasted with normal cast concrete surfaces (assuming use of a type 1 Portland cement rather than a type 5 or other special cement). For comparison, type 1 Portland cement was ball milled until 90% of the particles were less than 10 microns and was separated into two equal parts. From one part, hydrated control samples were prepared by caking at 100–500 lbs./sq. in. and hydrating with water. Identical size test samples were prepared by compressing the ground cement to 40 tons/sq. in. and hydrating in water. The control samples and the test samples were then immersed in separate beakers containing, respectively, one mole of hydrochloric acid and one mole of sodium hydroxide, to determine solubility through time. Results showed that the test samples were 40% less soluble in the alkaline solution than the control samples, and 32% less soluble in the acid solution.

An important feature of the synthetic aggregates of my invention is their resistance to spalling. I use "spalling" in its broadest sense to include decrepitation as of crystallized SiO$_2$, quartz, alums, etc., and the explosive release of steam by overheating of trapped water which may exist in naturally-occurring aggregates. Concrete is known to be subject to spalling because it is almost impossible to prevent some water entrapment, and it is impractical economically to find naturally-occurring aggregates which will not spall. The synthetic aggregates of my invention are spall proof unless heat is applied so suddenly as to glaze the surface over before any water present can escape. But this spall-resistant feature can be further enhanced, as subsequent disclosures will show.

While the various disclosures of processing features and data show marked improved properties controllably produced thereby, results appear clearly to show that the processing by my invention to produce synthetic aggregates causes desirable changes in the solid state chemical reactions which occur between the phases present in cement. A compatible material added to my dry starting material may of course also introduce still an additional system or systems, or in some other way affect the solid state reactions which occur. Among the most significant characteristics noted, as contrasted with prior art materials and practices, are the following: (1) solubility in acid media is reduced by the practice of my invention; (2) solubility in alkali media is reduced; (3) resistance to spalling is developed, and this property is still further enhanced by other treatment; (4) the crystalline structure is altered; (5) the relative density of the cement product forming the aggregate is increased; (6) the heat liberated on contact with water is increased, and the rate of temperature rise is also accelerated; (7) the setting or crystallizing rate is accelerated, and maximum strength is reached in less time; (8) the crushing strength of the aggregate and concrete is greatly increased; (9) the hardness of the aggregates is much greater than that of hydrated neat cement; and finally (10) the tensile strength of the aggregates, as compared with hydrated neat cement, and of the resulting concrete is increased by at least a factor of 10.

Many different, commercially desirable modifications of aggregate and various types of monolithic, economically sound concrete-like structures are made possible by the practice of my invention. The general scope and economic and technical significance of such aggregates and cast concrete-like structures may be better understood by reference to the specific examples appearing hereinbelow.

In the production of a common grey concrete floor, following one example of practicing my invention, aggregates were first produced by compressing type 1 Portland cement from the Riverside, California, area (Riverside Portland Cement Co.) without grinding (it was found to be about a −325 mesh material) at 40 tons/sq. in. to produce form-retaining slugs 1¾″ diameter by 1¾″ thick. The slugs were then crushed, and the crushed fragments passed successively through ⅝″, ⅜″, ¼″, ⅛″ and 80-mesh screens. Fragments retained on the ⅝″ screen are returned for further crushing, and the fines passing through the 80-mesh screen returned for further compaction. The resulting five fractions were then mixed to a modulus providing minimum voids. The modulated fragments were charged into a hydrating tank in proportion of one ton of aggregate to three tons of water, provision being made for raking the aggregates at the rate of one raking pass per minute. An exothermic reaction immediately occurred, maximum temperature being reached in about eight hours. At the end of twenty-four hours the resulting crystallized aggregates were removed from the tank and freed of excess water. About 5% of water remained absorbed, but this will gradually be lost.

Four parts of this aggregate were mixed with one part by weight of type 1 Portland cement, with enough water to form a castable mass, using standard concrete practice. Because of the aggregates the thickness of the floor was reduced by one-third. Depending on the base on which the floor is laid, reinforcing rods could also have been left out.

In producing a floor or like surface subjected to wear, compression of the slugs may be between 20 and 40 tons/sq. in. but not appreciably above the latter. Water should always be used for the crystallizing medium rather than a fluosilicate solution. These controls will assure an aggregate not appreciably harder than the matrix so that wear will be uniform.

In addition to the fact that the floor formed with the synthetic aggregates may be made thinner, it has the further advantages that it is spall resistant (not entirely spall proof), has greater strength, resistance to wear and cracking, and is more resistant to the action of alkalis and acids. Its most marked difference, however, is in its absolute uniformity, with no appreciable segregation of its constitutents such as occurs when materials of different densities are used. While this advantage is marked when form casting techniques are used, it becomes very pronounced when centrifugal casting procedures are employed.

As a second example in the building industry, type 1 Portland cement purchased from the Ideal Portland Cement Co. and produced by their Laramie, Wyoming, plant was processed as in the previous example, except that the slugs were compacted at 50 tons/sq. in. and the screens used for sizing the crushed slug fragments were ¾″, ½″, ¼″, ⅛″ and 80 mesh. Modulation was such as to provide minimum voids with the above size fractions.

One ton of modulated fragments was then charged into a tank holding three tons of a 3% water solution of equal parts of zinc and magnesium fluosilicate. Maximum temperature developed in four to five hours. The higher initial pressure used also appeared to cause production of more total heat. After twenty-four hours the cured aggregates were removed and freed of excess water. Eighty-six parts of the aggregates so produced were mixed with fourteen parts of ideal type 1 Portland cement, and water added in sufficient proportion to cast a T-shaped structural beam. The thickness of the cross members and upright was made exactly half that of a standard concrete beam used as a control. In both the control and test beams, 10 steel cables were extended longitudinally through the beams by first pre-stressing the cables to 120 p.s.i., casting the concrete of the beam around them, allowing the concrete to set, and then releasing the cables. Failure tests on the control and test beams were conducted and they showed that the test beam employing my new synthetic aggregates was capable of supporting the same load with half the total cross section of the control beam. At the point of failure, no pull-out of aggregates was found in the test beam; but, notwithstanding the prestressing of the control beam, considerable aggregate pull-out was found at its failure point.

For comparison, the above tests were repeated using type 3 or high early strength Portland cement, and substantially identical test results were obtained.

According to another example, type 4 Portland cement from the Lone Star Portland Cement Co. (Texas) was ball milled until at least 90% was less than 10 microns in size and no particles exceeded 25 microns. Slugs of cylindrical shape were formed using a pressure of 100 tons/sq. in. The same crushing and modulating conditions were followed as in the first described example, and one part of the modulated aggregates was introduced into three parts of a water solution comprising 1% magnesium fluosilicate and 2% zinc orthosilicate. Continuous agitation of both the water and aggregates was used to prevent overheating and agglomeration. The use of type 4 cement appeared to reduce heat formation notwithstanding the smaller average size of cement particle, and higher pressure of compaction tends to increase the total heat production and rate of temperature rise. The total heat produced appears greater than in the preceding examples, however, but the crystallized aggregates are removable and usable after twenty-four hours. The resulting aggregates are extremely hard with a compression strength of 30,000 p.s.i. based on the use of 6″ x 12″ cast test sample as described above, but actually having a very much higher compression strength.

Using standard forms, a hyperbolic paraboloid roof structure may be cast using eighty-six parts aggregate to fourteen parts type 4 Portland cement. The thickness of the roof depends of course on its total span, but in general it can be formed one-half as thick as usual shell roofs and still require no supporting beams or reinforcement features—a feature which is characteristic of this type of structure. The roof described will set in seven days and fully harden in twenty-eight days, unless the setting process is accelerated by washing the same with a magnesium or the like fluosilicate solution. Regardless of the treatment, the shell roof so produced will be truly monolithic, with firm intercrystalline linkage and monolithic appearance throughout the aggregate and matrix portion. This crystallizing process advances with time so that some slight increase in strength and other desirable properties will continue to develop, probably for several years.

A further example of the invention is in the production of centrifugally cast concrete. Using the concrete mix of the preceding example, a test was made to improve the properties of centrifugally cast concrete sewer pipe. One such pipe section was found to have a diameter of 8′ and a length of 10′. Its side walls were approximately 9″ thick and its weight in excess of 20 tons. It was formed with a standard sewer pipe chine at one end and a matching annular recession at the opposite end. Because of the difference in specific gravity of the various constituents of the prior art or standard concrete mix used, centrifugal action causes a separation or partial stratification. Heavier fractions go to the outside, lighter to the inside. Rejects are therefore fairly common. Moreover, the weight is so great that the chine has a piece broken out of it readily if the pipe section is upended or engaged by a large hook or chain during handling, and the completed pipe becomes unusable or must be repaired at the installation site.

Using the same mix as in the preceding roof example, such a sewer pipe may be cast to produce a high strength, denser, relatively thin-walled structure with surfaces more resistant to corrosive attack by sewage. Experimental production of such a pipe section with 5" thick walls and a total weight of slightly under 10 tons indicates that still further reduction of wall thickness is possible. The standard steel reinforcement used in present practice, or a modification thereof toward lighter weight, should continue to be used. The decreased breakage is an important factor; but when one considers that the average rate for hauling such pipe to the point of installation is now about 10¢ per ton mile, the advantage to be obtained from lightness alone becomes increasingly important.

In another example of the practice of my invention I employed as a starting material a Cottrell precipitate from the Rillito Portland Cement Co. plant (near Tucson, Arizona). On analyzing, this precipitate was found to contain 7% by weight of free alkali as NaOH, balance mixed calcium oxide, silicates, aluminates, and ferrites from the original Portland cement feed mix to the kiln head. All the particles were less than 10 microns and much less than one micron in size. This product represents a waste material for the most part. Since Portland cement specifications allow a maximum of 0.7% free alkali, only a relatively small portion of this "fly ash" can be used in a commercial cement.

Slugs were formed of the precipitate material without preliminary treatment, using a pressure of 40 tons/sq. in. The slugs were then crushed, and the fragments screened and modulated in accordance with standard practice and the use to which they would be put. The modulated fragments were then mixed with at least three parts of water and the mixture agitated, both to prevent agglomeration and to promote water leaching of the excess free alkali. While more than usual total heat was developed, the maximum heat develops more slowly than in previous examples, and about ninety-six hours are usually needed for crystallization. The resulting aggregates may be used as in other examples. While developing some porosity, apparently because of the leaching out of free alkali, the aggregates tend to be somewhat denser, a little stronger, and possess less water-absorption capacity. More specific work is needed on this system, even though enough has been done to confirm that cement plant Cottrell precipitate can be used as a starting material and generally has the same behavior pattern when subjected to the new method as does commercial Portland cement.

According to still another example, I used as a starting material the ash obtained from burning petroleum fractions. When used as a fuel in large-capacity, steam generating plants, the petroleum residuum from the Dubbs cracking process is found to contain a relatively high content of inorganic material such as metal salts and oxides, silica, sulfates, and the like common to hydraulic cements. They are, of course, effectively calcined during burning of the Dubbs residuum. This ash is collected at the bottom of the stack as fly-ash; and, as collected, without additions, may be used in producing synthetic aggregates in accordance with my invention.

The petroleum Dubbs residue fly-ash is compressed without preliminary treatment to produce form-retaining slugs, the slugs crushed, and the crushed fragments modulated in the same manner as when commercial Portland cement is used. Slug compacting, crushing, and fragment modulation may follow procedures explained hereinabove. However, because of the excess soluble sulfates, sulfites and other water soluble constituents (the identity and content will vary with the source, but in general all such soluble constituents are harmful or at least not beneficial), crystallization is preferably carried out in a circulating water system. The resulting leaching produces a somewhat lighter material than those heretofore described, but the silicates and other hydraulic cement-producing oxide materials crystallize and produce a structure characteristic of the present invention. Using a preliminary pressure of 40 tons/sq. in., the specific gravity will average about 2.3; at 60 tons, 2.4; and at 100 tons, 2.5. The strength, however, is decidedly much greater than these density figures would indicate. The aggregates may be used in the usual way to produce concrete or the like structures.

Trinity brand white Portland cement from the Houston, Texas, plant of the General Portland Cement Co. was used in another example to produce white aggregates. This material was compressed at 40 tons/sq. in. and the resulting slugs were crushed on rolls to produce a minimum of fines. Following terrazzo practice the crushed fragments were separated on ½", ¼", and ³⁄₁₆" screens to form terrazzo sizes 2, 1, and 0, respectively. Four parts of 0 size fragments, two parts of the 1 size, and one part of the 2 size fragments were mixed together. This modulation is capable of producing a maximum of 96% of aggregates on the surface. The mix also produces about 40% of voids, a factor without significance if the prime function is surface appearance rather than strength. The modulating of the aggregates, as previously noted, can be performed after crystallization. The fragments were crystallized in three parts by weight of water, and after twenty-four hours may be removed from the water, excess water driven off, and used in a terrazzo or concrete mix.

Two parts of the resulting white synthetic aggregates are mixed with one part by weight of white Portland cement and water to form a castable mixture. The mix is then spread on the pre-brushed top surface of a type 1 Portland cement concrete base, preferably a base produced in accordance with the methods of my invention. Practices common to the industry are used to produce a suitable terrazzo type layer bonded to the sub-base.

After twenty-four hours the terrazzo surface is given a first grind and its surface then grouted with dry white Portland cement. Further treatment to regrind and polish the surface can be initiated after another twenty-four hours.

Another method is to cast the terrazzo layer face down on a smooth, imperforate surface and then to apply over the terrazzo layer a relatively dry backing mix of type 1 cement with an aggregate, preferably a light weight aggregate produced in accordance with my invention. Preferably also, a reinforcing screen is laid between the terrazzo face and concrete backing layers; and when the resulting panel is to be supported as on a wall, projecting panel attaching slips are carried by the reinforcing screen. Usual treatments such as vibration, vacuum pads and the like may be used to form a dense cast structure.

Regardless of the method of casting and the like treatment, in the layer of white Portland cement mixed with white synthetic aggregates crystal growth occurs between the cement matrix and the aggregate to form a monolithic slab, with little or no pull-out of aggregate when the surface is ground and polished. Much greater uniformity is also obtained and surface wear is even. The terrazzo type layer is also stronger, is less subject to cracking, and more resistant to many types of corrosion, fading and staining influences than usual terrazzo, synthetic or natural marble and other materials which it can replace. The surface does not weather unevenly as outside marble surfaces do. I have found, however, that acid treatment will undercut the matrix faster than the aggregates, thus showing that a surface comprising essentially only aggregates will be more resistant to weathering than one which exposes a substantial portion of the untreated cement matrix.

The above examples indicate the existence of an excellent medium for the control of color, particularly at a surface, when a major interest is decoration or appearance. Either the white aggregates or the white matrix or both may be modified as to color or surface texture, using coloring and texturing materials and techniques known in the art. More advantageously, however, coloring and texturing in accordance with the present invention should be used. It is known that many available so-called cement colors fade, show an uneven appearance, whether, or in other respects produce unsatisfactory results.

As an example of making colored aggregates, eleven pounds of phthalocyanine blue, Du Pont BT 284D, is intimately mixed with 1,989 pounds of Trinity white Portland cement and the mixture ground until substantially all particles are below 10 microns in size. I have been able to secure this desired result by using a 3' diameter x 6' long tube mill using silica pebbles (2" to 1/4" diameter) with 50% loading and controlled for continuous movement and total retention time of two hours. The finely-ground product is compacted to produce 1¾" slugs, using a pressure of 50 tons/sq. in. Higher pressures may be used with resulting final increased strength and hardness. A practical upper limit, however, is 50 tons if substantially uniform surface wear of the matrix and aggregates is desired.

The slugs are fragmented on crushing rolls and the resulting fragments graded as to size and modulated to the required percentage of voids as desired, following either concrete or terrazzo practice. For terrazzo work the blue colored fragments may be graded and modulated in accordance with the preceding example using white aggregates. As in previous illustrations, the fines are returned for further compression and the larger pieces either separately crystallized for special terrazzo work or returned to the rolls for further crushing. The classified colored fragments are then crystallized in three parts by weight of water, removed from the water in twenty-four hours, freed of excess moisture, and prepared for delivery to a point of use. The blue synthetic aggregates may be used in a white matrix produced by the use of, for example, a white Portland cement as in the preceding illustration; or in a colored matrix to match, contrast with, complement, or otherwise produce a suitable design.

In the production of colored aggregates I have found that with suitable selection of coloring materials, any color in the Munsell system can be achieved. I have found also that any naturally-occurring or synthetically-produced pigments and dyes which are alkali resistant can in general be utilized. The pigments are preferably between 2 and 3 microns in size and, in any event, must be thoroughly ground with the cement particles to produce a resulting finely-ground product and one in which the coloring material is intimately mixed with the cement particles.

Examples of coloring materials which I have employed successfully to produce extremely light-fast colored synthetic aggregates are: Du Pont RT 537D red either medium or light shades, GT 674D green, BT 284D blue, Y469D chrome yellow; Rickettson's #6 red, #8 red, #69 red, and yellow; manganese dioxides, chrome greens, copper carbonates and lead chromates from any source; and many inorganic pigment colors which have been produced experimentally such as hydrated cupro aluminum phosphate which produces a blue-green color.

Most of the dyes such as those listed hereinabove will be destroyed, will become very uneven on the surface, or will fade rapidly if they are merely mixed with cement; but if utilized to form colored aggregates in accordance with my invention, they produce a colored aggregate which is substantially completely fast to light and retains its color under the most rigorous test conditions. Experimentally I have cast a blue aggregate in a specially prepared blue matrix in the manner described hereinbelow, and subjected it to intense light containing wave lengths normally having a pronounced fading action. There is very little perceptible fading, as determined by a test piece stored in the dark and by comparison with a Munsell color chart, even after very long exposure. This is very unusual because blue, as well known, is the most likely to fade of all colors; and even naturally-occurring blue stones frequently will fade on long exposure to light.

I am unable to explain fully the chemical mechanism which results in the production of fast colors under the conditions of treatment described. There is an apparent solid state chemical reaction which results in color fastness and continued uniformity, that is, with no shift toward either end of the spectrum (normally, of course, the shift is toward the longer wave lengths). One very interesting phenomenon which will possibly help to explain the mechanism is the fact that when diatomite is used as a component of the synthetic aggregates there is less color shift than when it is excluded.

In the case of pigments, they may form members of a separate system or systems which crystallize with the remaining portion of the aggregate; or there may be occlusion, coordinate bonding, or other such mechanism involved. One advantage I have found is that, while with some colors a shift in the spectrum occurs in the treating process, this shift is easily allowed for and there is no further change thereafter in the initially processed color. Many pigments such as the iron oxides, iron carbonates, manganese oxides, chromic oxides, etc. do not show this shift. It appears from a relatively large number of test results that no color shift will occur if pigmented metal components of the non-amphoteric metals are used.

In the case of dyes, the most efficient appear to be those capable of forming lakes with components of the cement. Several examined criteria appear to show that my process does not form a true lake in the classical sense. I have, moreover, successfully employed dye stuffs in which laking does not occur, and therefore I do not wish to be bound by any specific explanation or selection of dye stuffs. Almost all dye stuffs which form lakes with components of the cement will show a color shift toward the longer wave lengths when combined with the cement, but the shift which occurs when using dyes is also readily allowed for and controlled to produce a desired color.

The colored aggregates produced in accordance with the above disclosure not only exhibit color fastness as produced, but they retain this characteristic when they are finely ground to pigment fineness. They can then be utilized in admixture with a white cement or the like to produce a matching or contrasting matrix with colored aggregates. They can, of course, also be used for coloring any type of commonly used cementitious substance such as plaster, mortar and the like; and, while they will be found relatively more expensive to use than cement and mortar colors heretofore sold commercially, they have certain advantages which recommend their use for special purposes.

For purely decorative purposes such as in the preparation of paneling, bases and the like for art objects, various combinations of colors and other materials to give special colored effects can be used without affecting adversely the properties of the aggregates. One example is to imbed small aggregates of contrasting color into a colored or white aggregate so that when the latter or larger aggregate is on the surface and the surface polished, a variegated effect will result which will continue even though the surface may be submitted to wear. Bright but relatively inexpensive metals such as bronze filings and fine stainless steel threads also may be introduced as fillers to produce special surface effects. I have obtained special variegated effects in aggregates also by taking two contrasting ground mixtures of white cement and pigments and lightly mixing them before compression. These variegated-type aggregates may be used as such, or they may be partially pulverized for inclusion in a cement matrix. Indeed, this technique, by holding a property fast by incorporating a material in an aggregate and then comminuting the aggregate for incorporation into a cement matrix, may be used in other modifications of the invention.

In another example of my invention, twenty parts of chrome yellow are intimately mixed with 1,980 parts of white Portland cement, following the practice described in the example for producing a blue aggregate. The resulting, very finely-divided dry product is pressed at 40 tons/sq. in. to produce slugs, the slugs crushed on rolls, and the resulting fragments crystallized in three parts of water to produce a yellow colored aggregate. This aggerate is then ground to pigment size for later use in producing yellow cast structures. The pigment is either ground dry or, if ground wet, it is dehydrated so that it will be available for later use as a dry pigment having an average particle size of 2–5 microns.

Seven parts of the same chrome yellow by weight are then mixed with 1,993 parts of white Portland cement, following the same method as described above; slugs therefrom are compressed at 40 tons/sq. in., the slugs crushed with a minimum of fines, and classified to produce five fractions passing successively a $\frac{5}{8}''$, $\frac{3}{8}''$, $\frac{1}{4}''$, $\frac{1}{8}''$ and 80-mesh screen. The classified fragments are then modulated to minimum voids, crystallized in three parts of water, and removed from the water ready for use in twenty-four hours.

One part of the yellow pigment produced as above is then mixed with two parts of white Portland cement, and twenty parts of this mixture are combined with eighty parts of the yellow aggregate and enough water to produce a castable mass. A cement floor or the like made with this special concrete is not only substantially uniform in color and fast to light, but it will also have increased strength and excellent wearing properties. This type of colored floor or the like can be modified in several ways. One obvious method is to follow terrazzo practice in the preparation of the mixture of aggregates and cement. Still another modification, particularly where light weight together with strength and color is important, is to combine diatomite or perlite in both the aggregates and matrix, following the methods described in later examples.

As an illustration of the production of a light weight, completely spall-proof aggregate, I have milled together three parts by weight of white Portland cement and one part by weight of a powdered, air-dried diatomite; 1,880 parts of this mixture are then milled with twenty parts of Rickettson's iron oxide yellow. Milling is conducted in a tube mill following the general practices described above to assure complete mixing and adequate grinding, preferably until most of the particles are less than 10 microns in size.

It should be noted at this point that diatomite contains approximately 4% of combined water, and the drying of the diatomite should not occur at a sufficiently high temperature to drive off this combined water. The diatomite should also be unwashed so that the naturally-occurring alkalies in the product, calculated at usually 2% to 3% of calcium carbonate, are retained. I have found too that while diatomite from any source may be employed, so-called fresh water diatomite appears to give the best results.

The intimate, finely-divided mixture of white Portland cement, diatomite, and iron oxide yellow pigment is compressed at 40 tons/sq. in. to produce form-retaining slugs which are crushed and the fragments modulated in accordance with cement practice to produce a product having minimum voids. The modulated fragments are then crystallized in three parts of water in which up to about 3% of a soluble alkali metal or alkali earth fluosilicate is dissolved if increased hardness is desired. Since the diatomite and iron oxide pigments added to the cement are not only compatible with it but chemically combinable therewith in the solid state to produce an interparticle bonding and crystallizing action, much greater hardness and uniformity of the resulting crystallized aggregates are obtained than would normally be expected. Resistance to surface abrasion, for instance, is as great as a hard aggregate produced with type 1 Portland cement as in the first described example (see column 13). While the aggregates are much lighter than synthetic aggregates made with Portland cement alone, they have only about 20% less compressive strength with all other desirable properties being substantially the same. The aggregates are as color fast as the simple combination of color and white Portland cement; and, as in the case of the heavier type colored aggregates, the uniformity extends completely through the mass.

One of the significant properties of the aggregates produced by the above example is their resistance to spalling, a property which is neither improved nor adversely affected by the presence of color. An aggregate produced from only cement has considerable resistance to spalling, but this resistance is increased markedly by the presence of the diatomite. The proportion of diatomite to cement may be as high as 40% by weight; and when color is not a factor, ordinary Portland cement containing the usual proportion of iron found in Portland cement types 1–5 may be employed. Normally type 1 Portland cement is suitable for most applications. When color is not included, milling to a particle size of $-25$ microns ordinarily is adequate. Slug compacting pressures may be as low as 20 tons or as high as 200 tons/sq. in. or higher, depending upon the properties desired. I have not found that any significant deleterious compressing of the diatomite occurs with increased pressure. When a spall-proof concrete using aggregates comprising a mixture of diatomite and Portland cement is employed, it is preferably modulated to minimum voids and only enough Portland cement or cement-diatomite mixture is used to form a complete matrix filling such voids. The relative proportions of cement and aggregates used by weight will change, depending upon the percentage of diatomite in the aggreate. Following this practice, a compressive strength of between 12,000–15,000 lbs./sq. in. is readily obtainable, and the same crystal growth and resulting monolithic structure between the aggregate and the matrix portions occur as in previously described examples.

The properties may be modified in the same general manner as previously described; namely, variation of compression strength in producing the slugs, variation in grinding time, and variation in the crystallizing techniques. In general, the use of fluosilicate in the crystallizing water will produce a stronger but less mechanical shock-resistant product.

The significant property of the above products, other than their lightness, is their resistance to spalling. The aggregates will fuse in an oxyacetylene flame without spalling or shattering, even when fully wetted. A hole may be burned completely through a concrete structure with an oxyacetylene flame without spalling. It is obvious, therefore, that the crystals produced in the concrete are also nondecrepitating. A concrete or the like structure employing such aggregates can therefore be used to advantage in many installations where resistance to spalling is important, and this spall-proof feature may be combined with many other features.

One specific example of a spall-proof concrete is to produce the aggregates in the usual way described above, using as starting materials 18.9% by weight of diatomite and 81.1% of type 1 Portlant cement. This material is mixed dry, compacted, and treated by the remaining steps of the process to produce a spall-proof aggregate. One manner of producing a spall-proof concrete is to employ eight parts by weight of these aggregates to twenty parts by weight of a dry cement product in which 10% by weight of powdered diatomite has been mixed with enough water to produce a castable structure. Another procedure is to mix sixty parts by weight of dry Portland cement with forty parts by weight of the above described cement-diatomite aggregate which has been previously crushed to —200 mesh. Twenty parts by weight of this mixture may be used with eighty parts by weight of the spall-proof aggregate in producing the spall-proof concrete structure such as a jet runway, for example.

Examples of advantageous use of the spall-proof feature include carrier decks, which have presented a considerable problem since planes with jet engines have been used. Materials which have been suggested for use on carrier decks and which would withstand the high temperature of jet exhausts are either too heavy, are incapable of showing guide markings, or have some other disadvantage. A deck may be laid, using my improved aggregates, and a concrete structure produced therefrom which is both light in weight and spall resistant. Moreover, substantially any desired color or combination of colors may be used as, for example, a predominantly white deck with colored markings to indicate functional areas. Military and commercial runways for jet aircraft may also be produced in the same manner.

When extreme lightness is required with relatively high strength and where spall resistance is not a factor, I may produce a synthetic aggregate using 10% to 20% of a carefully vesiculated, —100 mesh, hollow, substantially spherical perlite. To make this product, the heat vesiculated perlite is intimately mixed with commercial type 1 Portland cement which is usually —300 mesh. This mixing is carried out to avoid appreciable grinding of the perlite so that the hollow spherical perlite voids are retained. The mixture is then compacted to produce form-retaining slugs, using a pressure of 20–40 tons/sq. in.; crushing, modulating, and crystallization of the aggregates are in accordance with practices described above. With this material properly modulated I have obtained compressive strengths up to 12,000 lbs./sq. in., but with a specific gravity of the order of 1.8.

As an example of a further modification of the present invention, I have successfully produced aggregates and concretes using the same which are highly resistant to the passage of harmful radiation such as gamma rays. I am aware that suggestions have been made to utilize barium compounds in concrete to improve its shielding action, but for the most part attempts to use barium compounds in ordinary cement practice have not yielded appreciable results. One method is to use a Portland-type cement containing a relatively large proportion of barium of the type sometimes called barium cement. Like other Portland cements, barium cement does not have a definite known structure but comprises several systems in which barium partially replaces the calcium.

Fifty parts of a barium cement are ball milled with fifty parts of a barium compound to promote complete mixing but not substantial grinding, and the resulting mixture is compressed at a pressure of 50 tons/sq. in. to produce form-retaining slugs. Thereafter the slugs are crushed, the resulting fragments classified as to size and modulated in accordance with concrete practice to minimum voids, and crystallized in three parts of water for twenty-four to forty-eight hours. A portion of the aggregate so produced is ground to about 200 mesh and dried. The dried ground aggregate material is then mixed in proportion of one part to three parts of a barium cement. Twenty parts by weight of this mixture are combined with eighty parts by weight of the high-barium synthetic aggregates and enough water to produce a cast structure.

Several barium compounds may be used such as barium sulfate, barium carbonate, or barium silicate—the last being preferred. The proportion of barium compound used in the aggregate may vary but, since up to about 50% can normally be used without deleterious reduction in the desired properties of the aggregate and the purpose is to utilize as much barium as possible, approximately this proportion is preferred. A barium concrete cast in the manner described above with the special high barium aggregates exhibits the same kind of increased strength and hardness characteristics, and growth of crystals between the aggregates and matrix to produc a monolithic type structure. Thus a barium-rich concrete wall which is part of an installation to function as a radiation shield can be made thinner, both by reason of the greater shielding effect as well as the increased strength characteristics.

Another example of special properties in the aggregates of my invention and concretes produced therefrom is in the preparation of a floor or the like structure having controlled conductivity characteristics. There are many types of installations, such as hospital operating rooms, where the production of a conducting or semi-conducting floor is important. Attempts to control conductivity in such instances have been only partially successful. In general, the approach has been to use magnetite in the concrete mix.

I have been able to produce closely controlled conductivity characteristics by introducting a suitable conducting material into the synthetic aggregate and using a suitable proportion of this same or a complementary material in the matrix. Two general approaches within the scope of my invention have been used experimentally with successful results.

According to one practice, titanium dioxide is heated in the presence of a reducing agent such as hydrogen, methane, ethane, natural gas or the like to partially reduce the titania and produce a predetermined conductivity. Ten percent of the partially reduced titanium oxide is then mixed with type 1 Portland cement, the mixture compressed to 40 tons/sq. in., the resulting slugs crushed, the crushed fragments modulated in accordance with cement practice to minimum voids, and the modulated fragments crystallized to produce an aggregate. Twenty-five percent of this aggregate material is crushed to 100 mesh and included in the cement matrix. From 15% to 20% of the matrix material is mixed with 80% to 85% of the semiconductive aggregates and enough water to produce a concrete floor in accordance with usual practice. A floor made in accordance with the above example has about 50,000 ohms electrical resistance.

Another method which I have used successfully is to mix a diodic material such as galena or a semi-conductive material such as silicon or germanium with a hydraulic cement, and to process the same to produce a synthetic aggregate; galena ($PbS_2$) is preferred because of its lower cost. When galena is used, one part of galena by weight to four parts of Portland cement is used to produce the synthetic aggregate, following the same practices as described in the production of titanium dioxide and preceding aggregates. Producing a concrete in this same manner with 25% of the aggregate material combined with 75% cement in a matrix comprising 20% of the entire concrete less water also produces a concrete having approximately 50,000 ohms electrical resistance.

Among the important aspects of my invention are several features which make it possible to control the characteristics of a concrete completely and in an entirely scientific manner instead of partially and in an entirely empirical way.

One feature is that the entire concrete aggregate of may invention is of uniform density, and modulation of the aggregates to the desired voids is a direct relative weight function. In the case of conventional concrete, sand is usually figured to have a specific gravity of 2.65; gravel, a specific gravity of 2.66; and larger stone aggregates 2.9, assuming surface cracks, fissures and the like to be filled with water. In the simplest system, there are at least three specific gravities to consider, none is uniform from lot to lot and from location to location, and therefore modulation is at best empirical and practically inexact. Keeping in mind that in my invention the aggregates may be controlled to any desired size such as —100 mesh, —200 mesh, etc. in addition to the usual larger screen sizes, and keeping in mind that there is a definite crystal growth between the cement matrix and the aggregates, control of voids to a practical limit is easily accomplished and a very strong monolithic structure obtained. Tensile strength is of an entirely different order than in empirically derived cements, and compression strength markedly increased. Most important, results are uniform and absolutely predictable. Moreover, a concrete structure embodying my invention will always set up denser because of this water differential. Actually, one of the methods used in the prior art is to limit water and provide special handling to produce a dense structure, as of special test cylinders.

In the mixing and casting of conventional concrete of the prior art, common practice is to use more water than required to set or hydrate the cement matrix, this being necessary to obtain enough fluidity for casting. In the case of a concrete using my invention, it is necessary to use only just enough water because of uniformity of the mix; but since the dry synthetic aggregates will absorb 2% to 5% of their weight of water, any excess water is quickly absorbed and is retained in a position to contribute to hydration with no laitance of the surface such as frequently occurs in prior art methods.

Another feature of my invention is the uniformity of the monolithic structure obtainable. I have previously described the crystal growth between the aggregates and cement matrix, and the fact that the aggregates do not pull out of the matrix but break across at the point of fracture. This is not because of any lack of strength of the synthetic aggregates, because they may be produced harder and stronger than many rock or stone aggregates used in cement practice. In a given batch, the synthetic aggregates are mutually uniform, not differing with size and point of place of origin as do commercial aggregates of the prior art. The matrix, moreover, from a basic chemical standpoint may be substantially identical with the aggregates. When a given property is enhanced by the synthetic aggregate formation, such as color retention, spall proofness, conductivity, etc., a portion of such aggregates may be crushed and combined with the cement in the matrix to promote still further the uniformity of an entire concrete structure. In any case, intergrowth of crystals produces a substantially monolithic structure of markedly increased strength which breaks as a monolith under test but which otherwise has all the advantageous features of standard concrete.

My invention is primarily directed to special type products and structures using them, but ultimately should be able to compete with naturally-occurring materials. In the test results described above, slugs were compacted on a hydraulic press, the ram of which had a diameter of 1¾". As the diameter of the slug is increased by increasing the size of a hydraulic press, however, drag on the side of the slug and die is decreased, and a slug of 6" x 6" or 6" diameter x 8" long could readily be produced on a reasonably high speed press. I have calculated that producing fifty tons of aggregates a day, and assuming a low normal loading for freight, some special concrete structures could be installed as inexpensively now as with prior art concrete because of the greater strength and decreased volume needed; while in instances where rentable structures are involved, the added floor space which my invention would make possible for renting purposes would represent a further asset. In the case of the concrete pipe example given (see column 14), the pipe produced following my invention would have a somewhat higher basic price than prior art pipe but, considering the savings in breakage, size and cost of centrifugal casting equipment, size and cost of handling cranes, savings in breakage and rejects, and decreased hauling costs to point of installation, a substantial net saving should ultimately be realized. Special aggregates and concrete structures, however, such as colored bodies, spall-proof bodies, high-strength light-weight bodies, etc. have no counterpart in the prior art.

I have described my invention in detail so that those skilled in the art may understand the manner of practicing the same, but the scope of the invention is defined by the claims. Whenever in the claims or specification I refer to "hydraulic cement" I mean to include not only the products sold as such, but other available products comprising an inorganic system which sets and becomes substantially insoluble on addition of water, and which contain $CaO$, $SiO_2$, $Al_2O_3$, and $Fe_2O_3$, and which may be thought of as comprising such systems as $CaO$—$SiO_2$, $CaO$—$SiO_2$—$Al_2O_3$, or the inorganic chemical and functional equivalents of any of the above. Cottrell precipitate from a cement plant and fly-ash from petroleum burning are illustrative substances not normally thought of as hydraulic cements. By "addition substances compatible with hydraulic cement" I mean to include substances which are either inert or enter into a beneficial or non-deleterious reaction with any of the cement systems or compounds. Previously produced synthetic aggregates, metal particles, and diatomite are illustrative of these materials. Dyes capable of forming lakes has the commonly accepted meaning of a dye which can be precipitated from solution with $Al_2O_3$ to produce the type of coloring material known in the arts as a lake. All the terminology herein otherwise follows conventional technical practice in the cement and related industries.

I claim:

1. In the production of a concrete or the like cast body, the method of producing a synthetic aggregate for production of such concrete or the like which comprises compressing a pulverulent dry mass of hydraulic cement comprising essentially the system $CaO$—$SiO_2$ at a pressure between about twenty tons and about two hundred tons per square inch to produce a form-retaining slug, crushing the slug so formed to produce random shape, graduated solid fragments, and hydraulically crystallizing the said solid fragments in at least about three parts by weight of water for not less than about twenty-four hours while agitating the mixture to control the heat thereof to prevent cracking, to thereby produce aggregate bodies substantially more inert and having greater specific gravity, hardness, compression resistance and tensile strength than hydrated neat cement, together with the property of forming a continuous intercrystalline structure with a hydrated cement matrix.

2. An aggregate adapted for use in concrete to produce a monolithic structure, said aggregate comprising a mixture of at least 50% by volume of a hydraulic cement comprising essentially the system $CaO$—$SiO_2$ and a compatible modifying agent of a class consisting of inorganic pigments, organic dyes capable of forming lakes, and inert fillers having the effect of imparting to the finished product specific properties peculiar to such fillers, said aggregate characterized by an increase of at least about 5% in specific gravity as contrasted with the mixture of constituents from which produced and having a high compression and tensile strength together with a property imparted to the same by said modifying agent, said aggregate formed by intimately mixing together said hydraulic cement comprising essentially the system $CaO$—$SiO_2$ and a modifying agent of the class identified, compressing the resulting mixture between approximately twenty tons and two hundred tons per square inch, and then hydrating the resulting compressed product in at least three parts of water for at least about twenty-four hours.

3. An aggregate as defined in claim 2 in which said hydraulic cement is white Portland cement and wherein the modifying agent is a color of the class consisting of pigments and dyes capable of forming lakes.

4. An aggregate adapted for use in concrete to produce a monolithic formed concrete body, said aggregate comprising essentially crystallized hydraulic cement chemical constituents consisting essentially of the system $$CaO\text{—}SiO_2$$

said aggregate characterized by an increase of at least about 5% in specific gravity as contrasted with said constituents from which produced, a compressive strength of at least 12,000 lbs./sq. in., and a substantially higher tensile strength than hydrated neat cement, said aggregates resulting from compressing said hydraulic cement chemical constituents at a pressure between about twenty tons and two hundred tons per square inch and then hydrating the compressed product in a substantial proportion of water for at least about twenty-four hours.

5. The method of producing a fast-to-light cement color which comprises intimately mixing white Portland cement with a coloring material of a class consisting of pigments and dyes capable of forming lakes, compacting the dry mixture to at least 20 tons/sq. in., crystallizing the compacted mass in water at least about twenty-four hours drying the same, and pulverizing the resulting dry crystalline product.

6. In the production of a concrete cast body the steps of applying pressure at least equal to 40,000 pounds per sq. in. to a powdered dry mass of Portland type cement, crushing the resulting solid form-retaining slug, and hydrating the resulting random shape solid fragments in at least three parts by weight of water for at least twenty-four hours to produce synthetic aggregates of very high physical strength.

7. The method of producing very high strength, synthetic aggregates having the property of producing a monolithic body when included in a cast, hydrated, Portland type cement matrix by developing a mutually interlocking crystalline bond between aggregate and matrix, which method comprises subjecting pulverulent dry Portland type hydraulic cement to a pressure of between about 20 tons per sq. in. and about 200 tons per sq. in., crushing the resulting solid form-retaining slug, and hydrating the resulting random shape solid fragments.

8. Synthetic aggregates comprising random shape fragments of hydrated Portland type cement having a density of at least 2.5 and a compressive strength of at least 12,000 pounds per sq. in., said aggregates formed by compressing dry Portland cement at a pressure between about twenty tons and two hundred tons per square inch and then crystallizing the resulting compressed product in at least three parts of water for at least about twenty-four hours.

9. In the production of a concrete cast body, the method of producing a synthetic aggregate for the production of such concrete or the like, which comprises mixing together a pulverulent dry mass of hydraulic cement comprising essentially the system $CaO\text{—}SiO_2$ and a proportion of a modifying substance capable of forming a chemically bonded solid body with the cement said modifying substance being selected from the class consisting of inorganic pigments, organic dyes capable of forming lakes, and inert fillers having the effect of imparting to the finished product specific properties peculiar to such fillers, compressing the resulting pulverulent dry mixture at a pressure between about twenty tons and two hundred tons per square inch to produce a form-retaining slug, and hydrating the resulting compressed product in at least about three parts by weight of water for at least about twenty-four hours.

10. The method of producing very high strength, synthetic aggregates having the property of producing a monolithic body when cast with a matrix of hydraulic Portland type cement, which includes the steps of compressing dry Portland type cement at a pressure between about twenty tons and about two hundred tons per square inch to produce a form-retaining relatively dense material, and hydrating said dense material in at least about three parts by weight of water for at least twenty-four hours.

References Cited in the file of this patent

UNITED STATES PATENTS

| | | |
|---|---|---|
| 1,114,140 | Horn | Oct. 20, 1914 |
| 1,923,370 | Hansen | Aug. 22, 1933 |
| 1,986,335 | Halbach | Jan. 1, 1935 |
| 2,553,618 | Willson | May 22, 1951 |
| 2,643,191 | Young | June 23, 1953 |
| 2,695,850 | Lorenz | Nov. 30, 1954 |
| 2,769,719 | De Vaney | Nov. 6, 1956 |
| 2,786,531 | Mangold | Mar. 26, 1957 |